United States Patent
Estevez et al.

(10) Patent No.: US 8,692,685 B2
(45) Date of Patent: Apr. 8, 2014

(54) WELLSITE COMMUNICATION SYSTEM AND METHOD

(75) Inventors: Carlos E. Estevez, Katy, TX (US); Christopher P. Reed, West University Place, TX (US); Remi Hutin, New Ulm, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 2249 days.

(21) Appl. No.: 11/230,915

(22) Filed: Sep. 19, 2005

(65) Prior Publication Data

US 2007/0062692 A1    Mar. 22, 2007

(51) Int. Cl.
*G01V 3/00* (2006.01)

(52) U.S. Cl.
USPC ..................... 340/853.1; 340/854.6

(58) Field of Classification Search
USPC ................ 340/853.1, 854.6; 175/24; 166/248
See application file for complete search history.

(56) References Cited

U.S. PATENT DOCUMENTS

| | | | |
|---|---|---|---|
| 3,951,209 A | 4/1976 | Gibbs | |
| 5,517,464 A | 5/1996 | Lerner et al. | |
| 6,693,553 B1 * | 2/2004 | Ciglenec et al. | 340/853.1 |
| 6,831,571 B2 | 12/2004 | Bartel | |
| 6,967,589 B1 * | 11/2005 | Peters | 340/854.6 |
| 7,154,411 B2 | 12/2006 | Ciglemec et al. | |
| 2004/0010587 A1 | 1/2004 | Altamirano et al. | |
| 2004/0150531 A1 | 8/2004 | Thomas | |
| 2005/0087368 A1 | 4/2005 | Boyle et al. | |
| 2005/0161260 A1 | 7/2005 | Koithan et al. | |
| 2005/0167098 A1 | 8/2005 | Lovell et al. | |
| 2005/0189142 A1 | 9/2005 | Garcia et al. | |
| 2005/0194182 A1 | 9/2005 | Rodney et al. | |

FOREIGN PATENT DOCUMENTS

| | | |
|---|---|---|
| EP | 0932054 | 7/1999 |
| EP | 1887181 | 2/2008 |
| GB | 2353546 | 2/2001 |
| RU | 2140539 | 10/1999 |
| RU | 2193655 | 11/2002 |
| WO | 2006108000 | 10/2006 |

OTHER PUBLICATIONS

Advertising Brochure, Adalet Wireless, Scott Fetzer Company, Cleveland OH, NCAT 44.
Survivor-Ruffneck, GE Fanuc Computer Dynamics, http://www.cdynamics.com/survivorruff.html, copyright 2003 Computer Dynamics Inc.
RigSense, M/D Totco, Varco Company—Instrumentation, http://www.varco.com.products/VDE/c5mdt/c5mdt/css/c5mdt_5.html.

(Continued)

*Primary Examiner* — Albert Wong
(74) *Attorney, Agent, or Firm* — Chadwick A. Sullivan; Brigitte Echols (57) ABSTRACT

A wellbore communication system for a wellsite having a downhole tool deployed from a rig into a wellbore penetrating a subsurface formation is provided. The system includes at least one wellsite sensor adapted to collect wellsite data, at least one mobile communication module locatable at various positions about the wellsite and a surface unit operatively connected to the at least one communication module. The communication module includes a housing, at least one communication interface adapted to receive signals from the at least one wellsite sensor, at least one signal-conditioning module positioned in the housing, a power supply and a connector adapted to receive a communication link to the surface unit.

1 Claim, 5 Drawing Sheets

(56) References Cited

OTHER PUBLICATIONS

Explore Technologies, iX104C2 Tablet PC Product Brochure, http://www.xploretech.com/index.pl?id=2164.

M/D Totco, Varco Company—Instrumentation, RigSense Screens, http://www.varco.com/products/VDE/c5mdt/c5mdt/css/c5mdt_6.html.

VarcoCC2003_19, RigSense Wellsite Information System, http://www.varco.com/onlinecatalog/VarcoCC2003/css/VarcoCC2003_19.html.

Xplore Technologies, iX104C2 Rugged Tablet PC Family, Advertising Brochure, 95-091404-V1, www.xploretech.com.

AnTech Special Engineering Projects, Daq>W, Wireless Data Acquisition System, Copyright AnTech Mar. 16, 2004, Exeter, UK.

* cited by examiner

WELLSITE COMMUNICATION SYSTEM AND METHOD

BACKGROUND OF THE INVENTION

1. Field of the Invention

The present invention relates generally to communication systems for wellsite operations. More specifically, the present invention relates to wellbore communication systems for passing signals between a surface unit and rig with a downhole tool suspended in a wellbore via a drill string.

2. Background of the Related Art

The harvesting of hydrocarbons from subterranean formations involves the drilling of wellbores into the earth. To create the wellbore, a downhole drilling tool is suspended from a drilling rig and advanced into the earth via a drill string. As the drilling tool is advanced, a drilling mud is pumped from a surface mud pit, through the drilling tool and out the drill bit to cool the drilling tool and carry away cuttings. The fluid exits the drill bit and flows back up to the surface for recirculation through the tool. The drilling mud is also used to form a mudcake to line the wellbore.

During the drilling operation, it is desirable to provide communication between the surface equipment and the downhole tool. Telemetry devices are typically incorporated into downhole tools to allow, for example, power, command and/or communication signals to pass between a surface unit and the downhole tool. These signals are used to control and/or power the operation of the downhole tool and send downhole information to the surface.

Figure 1:
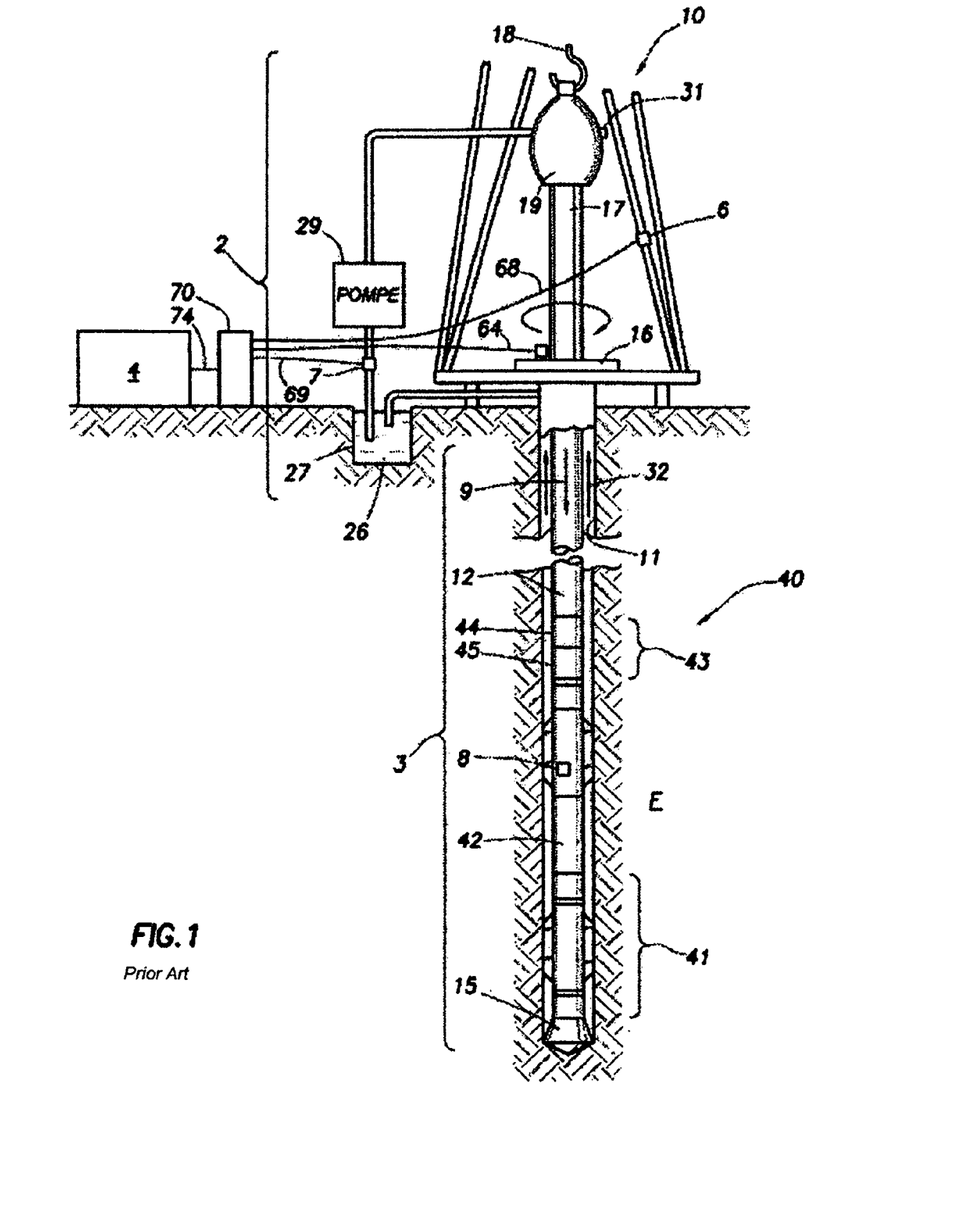
FIG. 1 is an elevational view, partially in section and partially in block diagram, of a wellsite having a surface unit in communication with a conventional drilling rig and a downhole tool.

FIG. 1 illustrates a prior art wellsite system used during drilling operations. The wellsite system includes a surface system 2 of the prior art, a downhole system 3 of the prior art, and a surface control unit 4 of the prior art. In the illustrated embodiment, a borehole 11 is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs.

The downhole system 3 includes a drill string 12 suspended within the borehole 11 with a drill bit 15 at its lower end. The surface system 2 includes the land-based platform and derrick assembly 10 positioned over the borehole 11 penetrating a subsurface formation F. The assembly 10 includes a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19, which permits rotation of the drill string relative to the hook.

The surface system further includes drilling fluid or mud 26 stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 9. The drilling fluid exits the drill string 12 via ports in the drill bit 15, and then circulates upwardly through the region between the outside of the drill string and the wall of the borehole, called the annulus, as indicated by the directional arrows 32. In this manner, the drilling fluid lubricates the drill bit 15 and carries formation cuttings up to the surface as it is returned to the pit 27 for recirculation.

The drill string 12 further includes a bottom hole assembly (BHA), generally referred to as 40, near the drill bit 15 (in other words, within several drill collar lengths from the drill bit). The bottom hole assembly includes capabilities for measuring, processing, and storing information, as well as communicating with the surface. The BHA 40 thus includes, among other things, an apparatus 41 for determining and communicating one or more properties of the formation F surrounding borehole 11, such as formation resistivity (or conductivity), natural radiation, density (gamma ray or neutron), and pore pressure.

The BHA 40 further includes drill collars 42, 43 for performing various other measurement functions. Drill collar 43 houses a measurement-while-drilling (MWD) tool. The MWD tool further includes an apparatus 45 for generating electrical power to the downhole system. While a mud pulse system is depicted with a generator powered by the flow of the drilling fluid 26 that flows through the drill string 12 and the MWD drill collar 43, other power and/or battery systems may be employed.

Sensors are located about the wellsite to collect data, preferably in real time, concerning the operation of the wellsite, as well as conditions at the wellsite. Surface sensors or gauges 5, 6, 7 are disposed about the surface systems to provide information about the surface unit, such as standpipe pressure, hookload, depth, surface torque, and rotary rpm among others. Sensor 5 is preferably adapted to receive data from downhole sensor 8. Downhole sensors or gauges 8 are disposed about the drilling tool and/or wellbore to provide information about downhole conditions, such as wellbore pressure, weight on bit, torque on bit, direction, inclination, collar rpm, tool temperature, annular temperature and tool face, among others. The information collected by the sensors and cameras is conveyed to the surface system, the downhole system and/or the surface control unit.

The surface sensors connect to surface unit 4 (of the prior art, as shown in FIG. 1) where the signal data received from the downhole sensors is processed and put into a format the clients to review. The surface sensor 5, 6 and 7 are connected to the surface unit 4 via a junction box 70. The junction box is a means to combine the multiple wires or cables 64, 68, 69 from the surface sensors 5, 6 and 7, respectively into one large cable 74. In this junction box, the input wires can be spliced together such that the junction box reduces the number of wires that extend from the box and connect to the surface unit 4. Cable 74 provides the hard-wired communication between the junction box 70 and the surface unit 4.

The surface unit 4 contains various processing equipment for processing the signals that are transmitted from the surface sensors. Analog signals from the surface sensors are converted to digital values and then processed in the surface unit 4. This processing function results in the generation of displays reflecting the information initially gathered from the downhole sensors.

The MWD tool 43 includes a communication subassembly 44 that communicates with the surface unit 4. The communication subassembly 44 is adapted to send signals to and receive signals from the surface using mud pulse telemetry. The communication subassembly may include, for example, a transmitter that generates a signal, such as an acoustic or electromagnetic signal, which is representative of the measured drilling parameters. The generated signal is received at the surface by transducers, represented by reference numeral 31, that convert the received acoustical signals to electronic signals for further processing, storage, encryption and use according to conventional methods and systems. Communication between the downhole and surface systems is depicted as being mud pulse telemetry, such as the one described in U.S. Pat. No. 5,517,464, assigned to the assignee of the present invention. It will be appreciated by one of skill in the art that a variety of telemetry systems may be employed, such as wired drill pipe, electromagnetic, acoustic, seismic or other known telemetry systems.

The surface unit 4 is typically operatively connected to the surface system 2 and the downhole system 3 of the wellsite for communication therewith. A monitor (not shown) is typically provided at the surface unit and manned by an operator. The operator may send commands from the surface unit to the downhole tool. The operator may also monitor downhole operations by viewing data displayed on the monitor of the surface unit.

As shown in FIG. 1, data generated by the surface and downhole systems is transferred to the surface unit 4 individually via a set of hard-wired cables. The first set of wired connections 64, 68, 49 are 'rigged-up' to transfer measurements from sensors about the wellsite to a junction box 70. A second hard-wired connection 74 is necessary to transfer the measurements from the junction box 70 to the surface unit 4.

The hard-wired connections typically require the use of numerous physical wires that connect the surface sensors to the surface unit 4 via a junction box 70. Current rig display and sensor acquisition systems are often bulky, heavy and difficult to rig up and down. These sensors 5, 6 and 7 are positioned at various locations at the wellsite. It can be a substantial requirement of time and effort to connect the wiring between the surface unit 4 and the surface sensors 5, 6 and 7. This time typically adds to the expense of the drilling operations. In addition, the bundles of wires at the wellsite can interfere with wellsite operations.

Despite previous advances in data transfer systems, there remains a need to provide techniques for efficient and effective transfer of data from the downhole tool to a surface computer. It is desirable that such a system provides a flexible and efficient means for transferring data from the surface and/or downhole system to a surface computer. It is further desirable to develop a wireless network architecture adaptable to harsh wellsite conditions. Such a system would preferably provide one or more of the following, among others: real-time communications, integrated communication links and/or hardware, simplified hardware configurations, reduced 'rig up' time, efficient setup, wired and/or wireless communications and operation, flexible setups, portability to desired locations about the website, reduction of wire lengths, reduced noise and efficient hardware set up.

SUMMARY OF THE INVENTION

In an aspect, the present invention relates to a wellbore communication system for a wellsite having a downhole tool deployed from a rig into a wellbore penetrating a subsurface formation. The system includes at least one wellsite sensor adapted to collect wellsite data, at least one mobile communication module locatable at various positions about the wellsite and a surface unit operatively connected to the at least one communication module. The communication module is operatively connected to said at least one wellsite sensor for receiving signals therefrom and converting the received signals to a form for processing by a surface unit In another aspect, the present invention relates to a communication module for passing signals from at least one sensor positioned about a wellsite to at least one surface unit. The wellsite has a downhole tool positioned in a wellbore penetrating a subsurface formation. The module includes a housing positionable about the wellsite, at least one communication interface positioned in the housing; at least one signal-conditioning module positioned in the housing, a power supply and a connector adapted to receive a communication link to the surface unit. The communication interface is adapted to receive signals from the at least one wellsite sensor. The signal conditioning module is adapted to convert a signal received from a surface sensor to a format receivable by the surface unit.

Finally, in another aspect the present invention relates to a method for communicating between a wellsite and to at least one surface unit. The method involves selectively positioning at least one communication module at a desired location at the wellsite, operatively connecting the at least one communication module to at least one sensor at a wellsite, operatively connecting the at least one communication module to the surface unit and passing a signal from the at least one wellsite sensor to the surface unit via the communication module;

BRIEF DESCRIPTION OF THE DRAWINGS

So that the manner in which the above recited features and advantages of the present invention are attained can be understood in detail, a more particular description of the invention, briefly summarized above, may be had by reference to the preferred embodiments thereof, which are illustrated in the appended drawings.

It is to be noted however, that the appended drawings illustrate only typical embodiments of this invention and are therefore not to be considered limiting of its scope, for the invention may admit to other equally effective embodiments. In the drawings.

DETAILED DESCRIPTION

Figure 2:
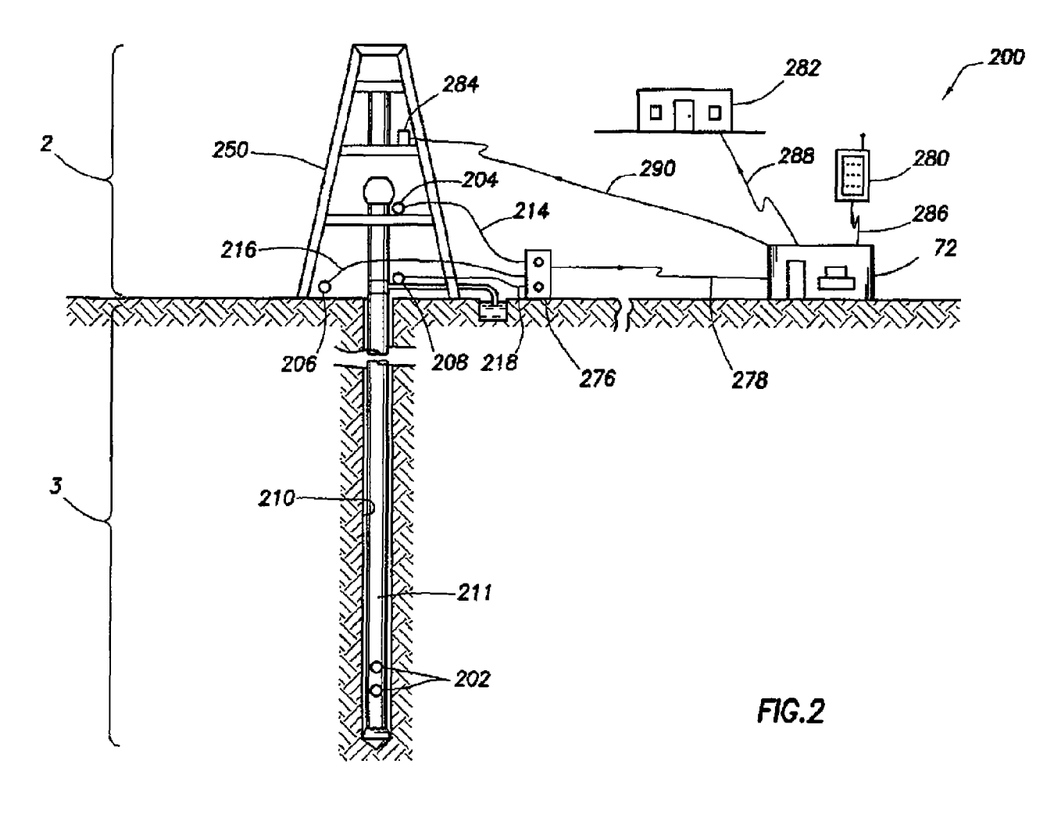
FIG. 2 is a view of an alternate wellsite communication system incorporating a third party subsystem.

FIG. 2 is a view of a communication system 200 for a wellsite having a surface system 2, a downhole system 3 and a surface unit 272. The surface system includes a rig 250 above a wellbore 210. A downhole tool 211 is advanced into the wellbore 210 from rig 250. One or more sensors 202, 204, 206, 208 are positioned about the wellsite.

The communication system 200 provides one or more communication modules 276 positionable about various locations about the wellsite. These individual communication modules may be adapted to the particular needs of the wellsite. The features of the modules also provide the ability to distribute the communication modules about the wellsite as needed. In some cases, the communication module 276 is operationally coupled to the rig, the mud pit, the surface unit, a third party rig network and/or other locations. In addition, one or more communication modules may be operationally coupled using a variety of links.

Downhole sensors 202 communicate with and transmit measurements information to surface sensors 204, 206 and/or 208. As shown, the surface sensors 204, 206, 208 are operatively connected to the communication module 276 through surface communication links 214, 216, 218, respectively.

One or more sensors are positioned about the wellsite to take various measurements thereof. A variety of sensors may be used on the wellsite. As shown uphole sensors 204, 206 and 208 are positioned at the rig and mud pit. Downhole sensors 202 are positioned along the downhole tool, for example in the BHA. An example of a downhole sensor may be a measurement while drilling tool. The sensors may be coupled together via a communication link. For example, the downhole sensors may be linked by mud pulse telemetry to the uphole rig sensors by a downhole link. Other wellbore telemetry systems, such as wired drill pipe, electromagnetic, acoustic, and other telemetry systems may be used as the downhole telemetry link for transmitting data from the downhole sensors to the surface unit.

Each surface communication link connects into an electronic module (not shown) in the communication module 276 via one or more surface communication links. The electronic module performs an analog-to-digital conversion of the input signal. The communication links may be combined or remain separated when linked to the communication module 276.

The communication module 276 operationally connects to the surface unit 272 and transmits data to the surface unit for further processing. A junction communication link 278 is provided to operatively connect the communication module 276 to the surface unit 272.

The communication module 276 may be adapted to perform signal-conditioning activities on signals received from the sensors. This signal-conditioning activity is preferably used to convert the raw data into a form that is useful for processing. Conditioning the signal (depending on the signal from the particular sensor) may involve multiplying the voltage by some value (such as 1.2), or shifting the voltage (by 1 to 2 volts) in order to fit the A/D converter. The signal may then be sent through an A/D converter to converts the signal to digital values. The signal may be used to collect digital values from the A/D converters inside the communication module.

The states of various switches may then be read and/or recorded to compile the data into a packet (such as an Ethernet type packet) for transmission the surface unit. Further signal processing and transmission, such as for various client interfaces, may also be provided. The surface unit may be any typical surface computer or processor, such as wellbore computer logging system used to receive wellsite data, process the data, send commands, display information and perform other wellsite processes.

The processed information may be transmitted to display locations and/or devices on and/or off site. The surface unit may send the information to a variety of output destinations. For example, such output destinations may include Personal Digital Assistant (PDA) devices 280 or a secondary surface unit 282 (i.e. a company office usually several hundred feet away from the surface unit). Other output destinations, such as a tablet or notebook personal computers, rig floor displays or other equipment on or off site, together with corresponding output communication links, may be used. These output destinations may optionally be portable and/or mobile. These output destinations may be used to display information about the rig site and respond thereto. Preferably, these output destinations are certified safe for the wellsite.

Output communication links 286, 288 are provided to link surface unit 272 with output devices PDA 280 and secondary surface unit 282, respectively. One or more additional surface communication links 290 may be connected to a surface sensor 284 for direct communication with the surface unit. Additionally, a downhole communication link may be provided from the surface unit 272 to the downhole sensors 202, for example using electromagnetic telemetry as described in US Patent Application No. 20050167098.

The communication links provided herein may be wireless, optical, hardwired or a combination of them. Wireless links may be used to provide flexibility in positioning the junction box and/or communication modules at desired locations about the wellsite. For example, hard wired cable may be, for example Ethernet cables or other cables used to pass signals therethrough. The wireless link may be for example an RF link extending between an RF transmitter, receiver or transceiver on respective units.

By way of example, an rf transceiver may be positioned in one or more relay boxes for communication with an rf transceiver positioned in the surface unit. One or more such hardwired or wireless communication links may be provided between one or more of the components as depicted. In some cases, it may be desirable to use a combination of wired and wireless connections depending on communication needs. In some cases, it may also be desirable to position certain modules near certain sensors, or away from certain noise generating devices.

Figure 3:
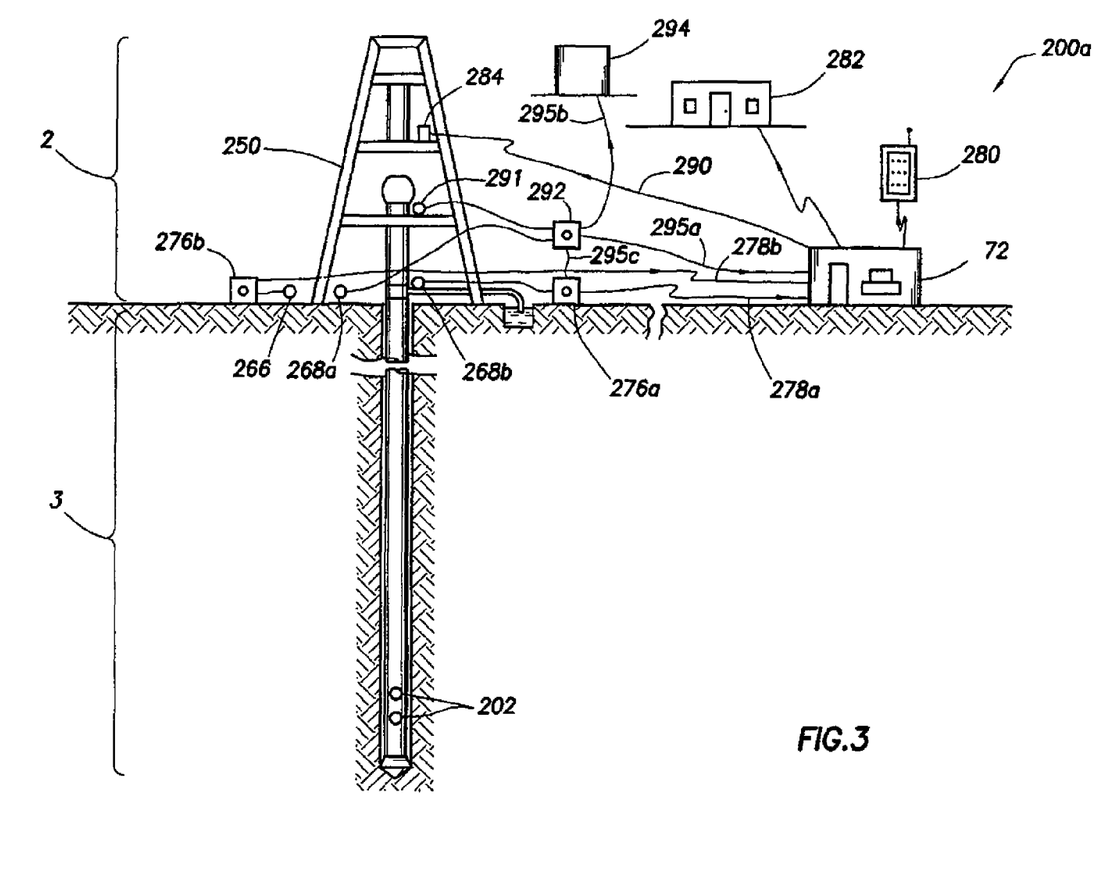
FIG. 3 is a view of the wellsite communication system of FIG. 2 with a communication module.

FIG. 3 is a view of an alternate communication system 200a usable with the wellsite of FIG. 2. This communication system may be the same as the communication system of FIG. 2, except multiple communication modules 276a, 276b, and 292 are used.

Communication modules 276a and 276b are preferably positioned in close proximity to the surface sensors 268b and 266, respectively. In this configuration, each module 276a, 276b has a separate surface communication link 278a, 278b to the surface unit 272.

At a wellsite, third parties may wish to have equipment at the wellsite and gather formation and well data during the drilling activities. Therefore, a third party sensor 291 may be positioned at the wellsite to receive information from the sensors 202, 266, 268a and/or 268b and transmit that information to third party equipment. As shown, the third party surface sensor 291 is located on the rig 250 and connects to the third party communication module 292.

This communication module 292 is operatively connected to the surface unit 272 via a third party communication link 295a for communication therewith. The third party communication module may also be operatively connected to the third party equipment 294 via a third party communication link 295b. The module 292 may perform the same processing functions as the communication modules 276a and 276b.

In addition to third parities having equipment at the wellsite, in some instances the third party equipment may interface with the modules 276b. The third party module 292 may then communicate with the surface unit 272 or other modules by linking to one or more of the communication modules 276. In some cases additional intermediary devices may be used. For example, a third party module is depicted as being operationally coupled to a surface sensor at the wellsite, and to the communication module. Other intermediary devices may be positioned at various locations along one or more of the communication links.

The communication module 276 used herein preferably provides flexibility in configuring the system at the wellsite and the positioning of the equipment at the wellsite. The communication module 276 is preferably a certified safe (e.g. flame proof) housing containing a power supplies, a plurality of signal conditioners, a relay box radio, a plurality of safety barriers (passive and/or active) and an antenna. One or more such modules may be used and positioned about various locations about the wellsite. By distributing the communication modules about the wellsite, rather than integral with the surface unit, the communication module may be reduced in size and positioned as desired Preferably, the communication system provided herein is scalable such that a number of modules can be trivially added or removed as the needs of the job dictate. The modules may be operationally coupled in a variety of configurations using a variety of communication links.

Figure 4:
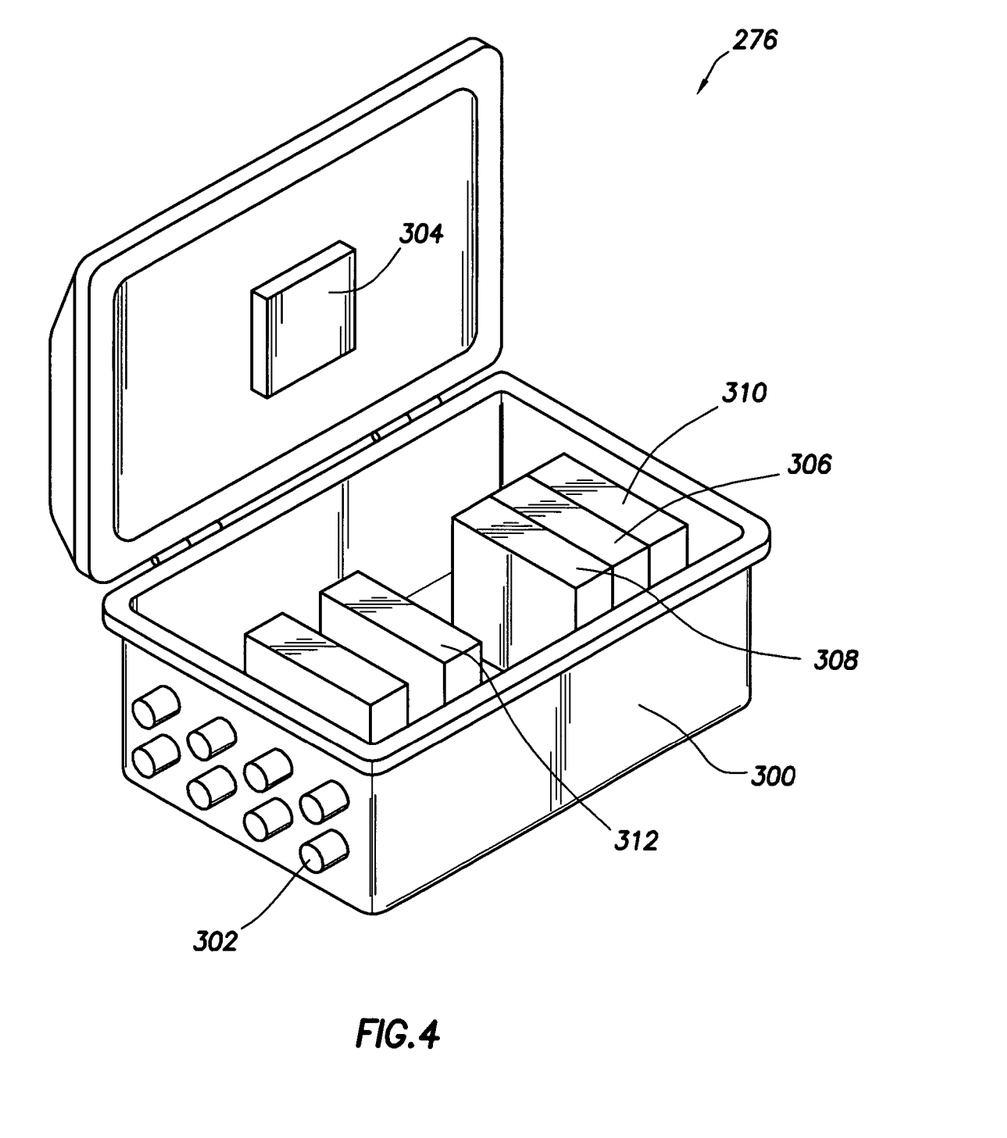
FIG. 4 is a view of a communication module usable with the communication systems of FIG. 2 and/or 3.

FIG. 4 is a detailed view of a communication module 276. The communication module includes various electronics positioned in a housing 300. The housing 300 is preferably certified safe (e.g. flame proof) to permit operation of the module in hazardous environments. Connectors 302 are provided to operatively connect the communications module to one or more sensors and/or a communication link related thereto.

The electronics preferably includes a power supply module 312, conditioning modules 308, safety barriers 310, an antenna 304, and a communication module radio 306. A variety of electronics may be used to process signals received from the wellsite for use by a surface unit and vice versa.

The power supply module 312 may be any common power supply capable of converting power, for example from AC to DC. A conditioning signal module 308 is provided to perform functions such as converting signals, from analog to digital, or from encoder to digital or other conversions. In addition, signal-conditioning functions can include signal voltage multiplying or voltage shifting. The communication module radio 106 is preferably a transceiver used to communicate with other radios positioned about the wellsite. The safety barriers 310 may be passive or active barriers used to limit energy passing from the certified safe enclosure to the hazardous area to prevent ignition of the hazardous environment. An antenna 304 is also provided to communicate signals between the communication module and the surface unit. Preferably, the antenna is positioned within the housing for protection thereof.

Figure 5:
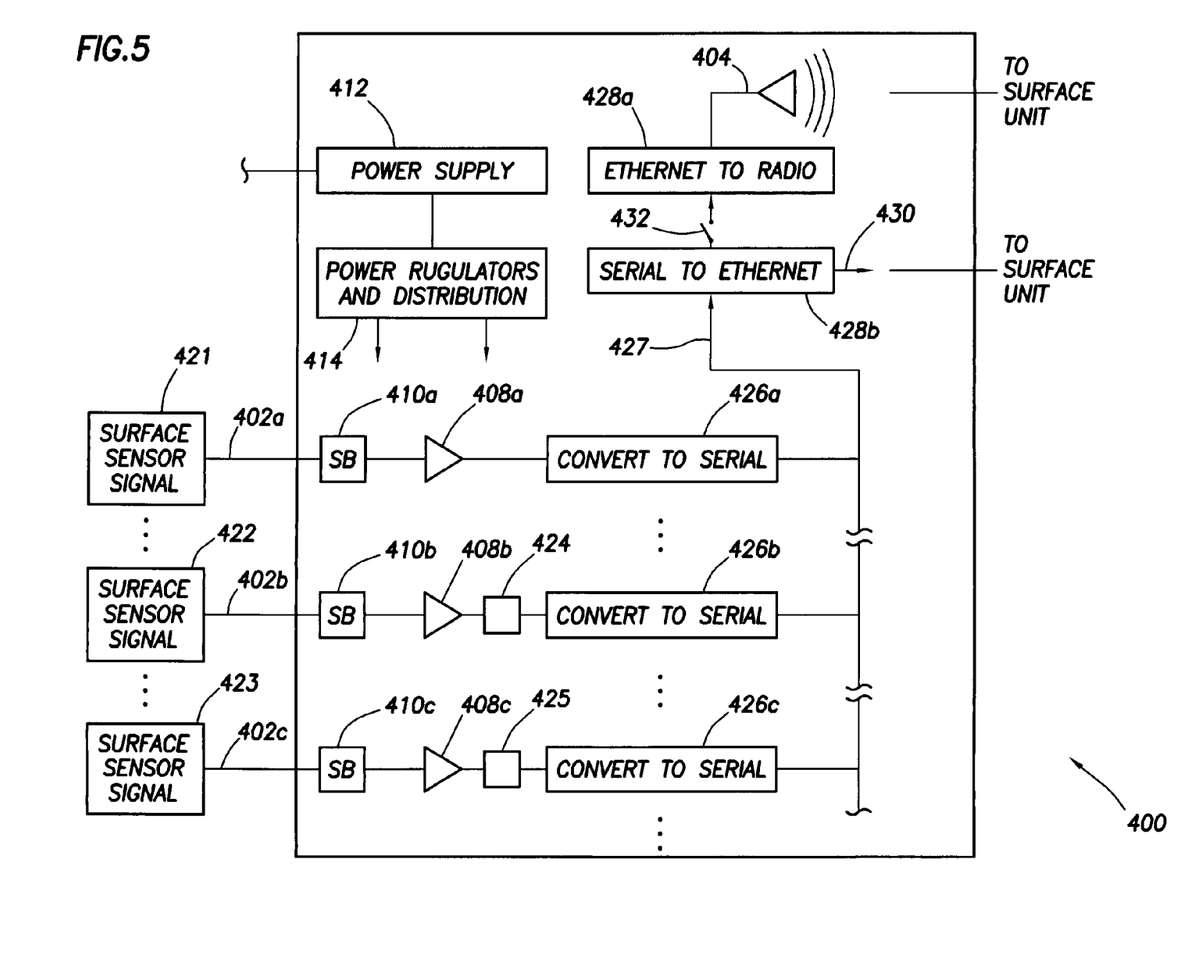
FIG. 5 is a schematic diagram depicting the operation of the communication module of FIG. 4.

FIG. 5 is a schematic diagram 400 of an example diagram depicting the operation of the communication module 276 illustrated in FIG. 4. As shown, communication module has three surface sensors 421, 422, and 423 positionable about the wellsite to take measurements, and connected to the module via links 402a, b, c. The sensors and links may be the same sensors used in FIGS. 2 and 3. These sensors transmit data received at the wellsite. Power may also be provided from a power supply 412, and distributed to the various electronics in the module 400 via power regulators 414 as shown.

The communication module receives this transmitted information via these links 402. This information can be of various forms. As mentioned, the communication module 276 performs signal-conditioning procedures on the received signals from the surface sensors. The signals pass through the safety barriers 410a, b, c and signal conditioners 408a, b, c. The signals may be passed through an analog-to-digital converter 424. Depending on the type of signal, the signals may then be passed through additional devices for processing. As shown, signals 422 and 423 pass through an analog to digital converter 424 and accumulator 425, respectively, but signal 421 does not pass through an additional device.

The signals may then be converted by converters 426a, b, c to a serial format for transmission via a high-speed communication bus 427. The signals are then passed to the surface unit via a communication link. The communication module can have a wired communication component 428b or a wireless communication component 428a to the surface unit. These components may be, for example as shown, Serial to Ethernet and/or Ethernet to radio. As shown, a wired data transmission is implemented through communication link 430, and the wireless data transmission is implemented through the antenna 404. These links may be the same as the links previously described herein with respect to FIGS. 2 and 3. One or more communication components may be used. A switch 432 may be provided to permit selective activation of one or more wired, wireless components for transmission. The switch may be hardware or software.

While the invention has been described using a limited number of embodiments, those skilled in the art, having the benefit of this disclosure, will appreciate that other variations are possible without departing from the scope of the invention as disclosed herein or from its true spirit. Accordingly, the scope of the invention should be limited only by the attached claims.

This description is intended for purposes of illustration only and should not be construed in a limiting sense. Only the language of the claims that follow should determine the scope of this invention. The term "comprising" within the claims is intended to mean "including at least" such that the recited listing of elements in a claim are an open group. "A," "an" and other singular terms are intended to include the plural forms thereof unless specifically excluded.

What is claimed is:

1. A wellbore communication system for a wellsite having a downhole tool deployed from a rig into a wellbore penetrating a subsurface formation, the wellbore communication system comprising:
   a surface control unit;
   a plurality of wellsite sensors adapted to collect wellsite data, wherein the plurality of wellsite sensors includes:
      a downhole sensor; and
      a surface sensor adapted to detect signals communicated from the downhole sensor;
   a plurality of mobile communication modules each operatively connected to one of the plurality of wellsite sensors for receiving signals therefrom and converting the received signals to a form for processing by the surface control unit, wherein:
      the surface control unit is wirelessly operatively connected to at least two of the plurality of mobile communication modules;
      the plurality of mobile communication modules includes a first mobile communication module located at a position about the wellsite that is distinct from a second one of the plurality of mobile communication modules;
      each of the plurality of mobile communication modules includes a power supply module and a signal conditioning module contained within a single housing;
      each signal conditioning module is capable of converting signals from a first form to a second form; and
      at least one of the plurality of mobile communication modules comprises:
         a communication interface positioned in the housing and adapted to receive signals from ones of the plurality of wellsite sensors; and
         a connector adapted for wireless communication between the communication interface and the surface unit;
   a plurality of communication links, wherein:
      ones of the plurality of communication links collectively operatively connect ones of the plurality of mobile communication modules to the surface unit;
      ones of the plurality of communication links collectively operatively connect ones of the plurality of mobile communication modules to ones of the plurality of wellsite sensors; and the plurality of communication links comprises hard-wired communication links, wireless communication links, optical communication links, and combinations thereof;
a third party module operatively connected for communication with one of:
the surface sensor;
one of the plurality of mobile communication modules;
the surface control unit; and
combinations thereof;
a third party sensor positionable at the wellsite and adapted to collect wellsite data, the third party sensor operatively connected to one of:
one of the plurality of wellsite sensors;
the third party module;
one of the plurality of mobile communication modules;
the surface unit; and
combinations thereof; and
a surface display unit operatively connected for communication with the surface control unit, wherein the surface display unit comprises one of:
a PDA;
a desktop computer;
an additional surface unit; and
combinations thereof.

* * * * *